US009361293B2

(12) United States Patent
Bustelo et al.

(10) Patent No.: US 9,361,293 B2
(45) Date of Patent: Jun. 7, 2016

(54) USING RENAMING DIRECTIVES TO BOOTSTRAP INDUSTRY-SPECIFIC KNOWLEDGE AND LEXICAL RESOURCES

(71) Applicant: International Business Machines Corporation, Armonk, NY (US)

(72) Inventors: Leugim A. Bustelo, Austin, TX (US); Donna K. Byron, Petersham, MA (US); Krishna Kummamuru, Hyderabad (IN); Alexander Pikovsky, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 14/030,688

(22) Filed: Sep. 18, 2013

(65) Prior Publication Data

US 2015/0081281 A1    Mar. 19, 2015

(51) Int. Cl.
*G06F 17/21* (2006.01)
*G06F 17/27* (2006.01)

(52) U.S. Cl.
CPC .......... *G06F 17/277* (2013.01); *G06F 17/2735* (2013.01)

(58) Field of Classification Search
USPC ....................................................... 704/7–10
See application file for complete search history.

(56) References Cited

U.S. PATENT DOCUMENTS

| 6,212,494 | B1 | 4/2001 | Boguraev |
| 7,617,232 | B2 | 11/2009 | Gabbert et al. |
| 7,860,873 | B2 | 12/2010 | Campbell |
| 8,271,411 | B2 | 9/2012 | Kaplan |
| 2002/0173946 | A1 | 11/2002 | Christy |
| 2003/0018646 | A1* | 1/2003 | Ohta ................. G06F 17/30908 |
| 2008/0300855 | A1 | 12/2008 | Alibaig |
| 2009/0287678 | A1 | 11/2009 | Brown et al. |
| 2010/0185700 | A1* | 7/2010 | Bodain ............. G06F 17/30734 707/803 |
| 2011/0066587 | A1 | 3/2011 | Ferrucci et al. |
| 2011/0125734 | A1 | 5/2011 | Duboue et al. |
| 2011/0271179 | A1 | 11/2011 | Jasko et al. |
| 2012/0102456 | A1* | 4/2012 | Paulheim .................. G06F 8/73 717/116 |

(Continued)

FOREIGN PATENT DOCUMENTS

WO    WO 2007/101973 A2    9/2007

OTHER PUBLICATIONS

Bufe III, John P.et al., "Disambiguation of Dependent Referring Expression in Natural Language Processing", filed Feb. 15, 2013, U.S. Appl. No. 13/768,136.

(Continued)

*Primary Examiner* — Leonard Saint Cyr
(74) *Attorney, Agent, or Firm* — Stephen J. Walder, Jr.; Reza Sarbakhsh (57) ABSTRACT

Mechanisms are provided for generating a lexical resource for linguistic analysis. A document data structure is received that comprises a renaming directive and filter logic is applied to the document data structure to identify the renaming directive within the document data structure. The renaming directive is analyzed to identify a relationship between semantic concepts represented by the renaming directive that are to be used to update a lexical resource based on the renaming directive. The lexical resource is updated based on results of analyzing the renaming directive. The updated lexical resource is output to a linguistic analysis system which performs linguistic analysis of a portion of textual content based on the updated lexical resource.

21 Claims, 4 Drawing Sheets

(56) References Cited

U.S. PATENT DOCUMENTS

| | | |
|---|---|---|
| 2013/0007055 A1 | 1/2013 | Brown et al. |
| 2013/0018652 A1 | 1/2013 | Ferrucci et al. |
| 2013/0066886 A1 | 3/2013 | Bagchi et al. |

OTHER PUBLICATIONS

High, Rob, "The Era of Cognitive Systems: An Inside Look at IBM Watson and How it Works", IBM Corporation, Redbooks, 2012, 16 pages.

Jakhete, Sumitra et al., "Automatic Extraction of Entity Alias from the Web", International Journal of Applied Information Systems (IJAIS)—ISSN: 2249-0868, Foundation of Computer Science FCS, vol. 3-No. 8, Aug. 2012, pp. 5-9.

Navigli, Roberto et al., "A Graph-based Algorithm for Inducing Lexical Taxonomies from Scratch", Proceedings of the Twenty-Second International Joint Conference on Artificial Intelligence (IJCAI'11), vol. Three, Jul. 16-22, 2011, 6 pages.

Srinivasan, Harish et al., "Cross document person name disambiguation using entity profiles", Association for the Advancement of Artificial Intelligence, 2009, 4 pages.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

USING RENAMING DIRECTIVES TO BOOTSTRAP INDUSTRY-SPECIFIC KNOWLEDGE AND LEXICAL RESOURCES

BACKGROUND

The present application relates generally to an improved data processing apparatus and method and more specifically to mechanisms for using renaming directives to bootstrap industry-specific knowledge and lexical resources.

Documents include information in many forms. For example, textual information arranged as sentences and paragraphs convey information in a narrative form. Some types of information are presented in a referential form. For example, a document can include a name, a word, a phrase, or a text segment that occurs repeatedly in the document. Many documents designate a replacement phrase or text to stand-in for the name, word, phrase, or text segment, and use the replacement text (the moniker) for each subsequent occurrence of the name, word, and phrase or text segment (the full name expression) after the first occurrence.

Natural language processing (NLP) is a technique that facilitates exchange of information between humans and data processing systems. For example, one branch of NLP pertains to transforming a given content in a human-usable language or form to a computer usable form. For example, NLP can accept a document whose content is in a human-readable form, and produce a document whose corresponding content is in a computer-specific language or form.

NLP is used in many different ways including recent use in Question and Answer (QA) systems. That is, with the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it using a variety of techniques including NLP techniques, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

Lexical resources are utilized to label/categorize/interpret individual tokens or sequences of tokens in text, prior to applying structural/grammatical analysis to discover additional relations between the tokens within a larger phrase or sentence. Examples of lexical resources are:

Dictionaries: contain features such as gender, part-of-speech, semantic category/type of common words in a language. Dictionaries are also referred to as 'Lexicon' in language processing terminology.

Gazeteers: a special kind of dictionary for proper names; a gazeteer indicates what semantic category the name is an instance of, e.g., Person, Municipality, Geographical Region, etc., and possibly gender and other features.

Ontology: an inventory of semantic categories/types, typically organized as a hyponym/hypernym tree (e.g. "Basenji is a kind of Hound").

Selectional restrictions: words such as prepositions and verbs become predicates in a relation tuple, and the argument positions in those predicates can sometimes be filled only by entities of particular semantic categories. For example, a plant can wilt but a car cannot. The dictionary entry for wilt may be augmented to reflect this semantic affinity with plants.

One key purpose for these resources is to record the affinity between words that specify individuals (proper names "Petey" or common nouns such as "Dog") at the base instance level and also type/category symbols. Many language processing tasks require the system to make an inference between instances and categories. In Question Answering systems in particular, that task is very high priority, because the Question often expresses a category restriction, e.g., "What Eastern European artist wrapped the Reighstag in 1995" and candidate answers must be judged as belonging to the category or not (in this example, each candidate answer would be scored as to its likelihood to fit the category 'Eastern European artist').

Documents from specialized domains utilize terminology that is not in standard dictionaries/gazeteers as well as novel semantic types that are not in standard ontologies. For example, company-internal documents describe business units, products, processes, etc. Legal or medical documents include jargon not familiar to non-practitioners. An NLP application that needs to process documents with such specialized vocabulary will encounter words not present in the system's given lexical resources.

SUMMARY

In one illustrative embodiment, a method, in a data processing system comprising a processor and a memory, is provided for generating a lexical resource for linguistic analysis. The method comprises receiving, by the data processing system, a document data structure comprising a renaming directive and applying filter logic to the document data structure to identify the renaming directive within the document data structure. The method further comprises analyzing the renaming directive to identify a relationship between semantic concepts represented by the renaming directive that are to be used to update a lexical resource based on the renaming directive. Moreover, the method comprises updating the lexical resource based on results of analyzing the renaming directive. In addition, the method comprises outputting the updated lexical resource to a linguistic analysis system. The linguistic analysis system performs linguistic analysis of a portion of textual content based on the updated lexical resource.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Computer systems that process natural language utilize a variety of linguistic knowledge sources as inputs. Some of the key resources required for supporting linguistic analysis and reasoning are ontologies (formal representations of knowledge as a set of concepts within a domain, and the relationships between pairs of concepts) for defining inventories of semantic concepts, hierarchies that define hyponym/hypernym relations between those concepts, named entity lists populated by proper names, and relation inventories that define actions or facts in the domain and the entities that can participate in those relations. In a question and answer (QA) system, such as the Watson™ QA system available from International Business Machines (IBM) Corporation of Armonk, N.Y., such resources are used in representing the meaning of questions and also in representing the meaning of passages from source documents that may contain the answer to the question. Building the requisite data assets to perform linguistic analysis and reasoning in a new domain, such as for documents containing legal or medical terminology, has historically been a time consuming task. Although building these assets is time consuming, the quality of the resulting QA system depends on the accuracy and completeness of these resources and therefore, their construction cannot be done in a perfunctory way. Using automated means, or semi-automated means, to create these resources is an important step in being able to field a QA system in a new domain.

One key step in creating these knowledge resources is to try to identify the important terms/concepts from the less frequent or ancillary terms/concepts. That is, given a set of documents, a key step is determining which words/relations need to be added to the QA system's resources to best aid document processing. To make the human time spent in resource building more productive, it is helpful if tools designed to aid domain exploration not only identify terms used in the domain, but also highlight terms/concepts that are more important or central to the activity being modeled and which can be used to build these data structures used by NLP and QA system operations. For those terms/concepts, the human developers can apply greater care in modeling the linguistic resources, and also more carefully validate that the language processing modules work as desired. Moreover, such identification of terms/concepts may be used to focus automated tools that can assist in the building of such ontologies, hierarchies of hyponym/hypernym relations, named entity lists, and relation inventories.

The illustrative embodiments make use of mechanisms for identifying renaming directives within portions of content and using the identification of these renaming directives to build data structures that assist in further processing of these portions of content, such as by Natural Language Processing mechanisms or the like. To assist with the understanding of the present detailed description, within the context of the present description the following definitions of terms will be used:

Document data structure (or "document")—a collection of data and/or metadata, such as in a file, set of files, or the like, stored in one or more storage devices and which represents a portion of content comprising one or more of text, graphics, images, hyperlinks, multi-media content, or the like;

Lexical resource—a supporting data structure used as a reference basis for performing Natural Language Processing, e.g., a dictionary, thesaurus, mapping data structure that maps one entity to another, e.g., a term to another term, a term to a part of speech, etc.;

Renaming directive—a statement within the content of a document data structure or metadata of a document data structure that specifies a correspondence between a long name string (the "full expression") and a short name string (the "moniker");

Full expression—a portion of a renaming directive that is a long name string (relative to a corresponding short name string of the renaming directive) representing a full, non-abbreviated, string for identifying a concept or entity;

Moniker—a portion of a renaming directive that is a short name string, (relative to a corresponding long name string of the renaming directive) representing a shortened form of the corresponding long name string or a stand-in text for the long name string, e.g. an acronym, nickname, or the like;

Referent—the entity that a referring expression indicates, e.g. the expressions "Dr. Johnson", "Samuel Johnson", "him", "The Buyer" could each be used in different circumstances to refer to a specific referent (a person in this case).

Dependent referring expression—a referring expression, in running text, that cannot be disambiguated without accessing information elsewhere in the text. Pronouns like him, reduced expressions like Sam, and monikers like The Buyer are dependent. To recover the referent for each of these dependent referring expressions, document processing systems link the dependent expression to an antecedent full-form expression that introduced the referent into the document.

Filter logic—logic implemented in either hardware, software, or both hardware and software, that applies rules, conditions, or other criteria to identify portions of content that satisfying or not satisfying the applied rules, conditions, or other criteria.

As mentioned above, the illustrative embodiments identify renaming directives within portions of content, e.g., document data structures, and use the identification of these renaming directives to build, modify, or otherwise augment data structures, e.g., lexical resources, used by Natural Language Processing (NLP) mechanisms. With the above definition of terms in mind, the renaming directives identified by the illustrative embodiments comprise a long name string (or full expression) which specifies a specific entity (the referent), and a shorter string (or moniker) that is used through the document (instances of the moniker being referred to as "dependent referring expressions"), and potentially in other documents, to refer to the referent, within documents of a corpus of information. The identification of the renaming directives is used to build data structures that may be used by Natural Language Processing (NLP) mechanisms, which may further be used in QA systems, when performing NLP processes to analyze portions of content or other textual input. For example, the illustrative embodiments may use the identification of renaming directives to generate populated listing data structures that list named entity types having instance/category pairs of the full expression and its related monikers. In addition, the illustrative embodiments may be used to find key predicates/relation words for a particular domain and then generate corresponding mapping data structures. Moreover, the illustrative embodiments may make use of the identification of renaming directives to identify key entity types for inducing an ontology or augmenting an existing ontology. Other data structures usable by NLP mechanisms may be generated as a result of the identification of renaming directives within and among the documents of a corpus of information.

One example mechanism that may be used to identify the renaming directives in documents is described in commonly owned and co-pending U.S. patent application Ser. No. 13/768,136 which is hereby incorporated by reference. While the mechanisms of the co-pending application will be used as an example of a mechanism for identifying renaming directives in documents in the description of the following illustrative embodiments of the present invention, it should be appreciated that this is but one example and other mechanisms for identifying renaming directives that may be known or later developed may be used without departing from the spirit and scope of the illustrative embodiments.

Using the mechanisms of the commonly owned and co-pending U.S. patent application Ser. No. 13/768,136 for performing identification of renaming directives, it should be appreciated that the renaming directive identification aspects of the illustrative embodiments utilize rules, patterns, and logic that are based on the recognition of characteristics of renaming directives. For example, the illustrative embodiments recognize that documents subjected to NLP commonly include renaming directives to a particular form of expression that defines a specified 'moniker' expression as standing in for the specified full name expression, i.e. the moniker is used throughout the document, or a collection of documents, as a shorter form of reference to a particular entity, named by the full expression. Anaphoric dependent referring expressions within the document or document collection that are expressed in the form of the moniker can be referentially linked unambiguously to the full name expression, unlike other dependent referring expressions whose referential value is recovered via a search/ranking/selection process to identify the antecedent expression of each dependent referring expression. Many methods of performing antecedent selection exist in the literature.

The illustrative embodiments recognize that in some cases the full expression of a renaming directive may appear towards the beginning of a document, with instances of the dependent referring expression that corresponds to the moniker scattered throughout the document. The renaming directive identification aspects of the illustrative embodiments recognize that in some other cases, the full expression may appear towards the end of a document, with instances of the corresponding dependent referring expression scattered throughout the document.

The renaming directive identification aspects of the illustrative embodiments also recognize that the full expression and the dependent referring expression may not appear in the same document, e.g., a cataphoric expression. A cataphoric expression is an expression that re-mentions an entity referred to by a subsequent expression. The cataphoric expression and the subsequent expression both refer to something outside of the document, which is the referent. For example, in a set of one or more documents, such as an agreement document associated with one or more addenda documents, the agreement document may include the full expression, and the agreement document and the addenda documents may include instances of the corresponding dependent referring expression.

The renaming directive identification aspects of the illustrative embodiments recognize that any amount of content in a given document (word distance), and any number of documents in a given set of documents (document distance) can separate an instance of a dependent referring expression from the corresponding full expression. Presently available NLP technology is ineffective or error prone in resolving the meaning of an instance of dependent referring expression unless the corresponding full expression also appears in close proximity of the instance of the dependent referring expression. As an example, some presently available NLP technology is bound to a few sentences or a paragraph within which to resolve the meaning of the dependent referring expression. If the dependent referring expression and the full expression are separated by, for example, more than six lines or a paragraph, such as when they occur several pages apart in a document, some presently available NLP technology simply uses the dependent referring expression without resolving the dependent referring expression to the corresponding full expression.

Other presently available NLP technology may attempt to resolve the dependent referring expression by linking an instance of a dependent referring expression to a previous instance of the dependent referring expression, such as to form a co-referential chain. The illustrative embodiments recognize that even if some existing NLP techniques can resolve dependent referring expressions that occur at great distances from another mention of the same referent, such resolving is prone to errors or inefficiencies due to their dependency on textual searches that traditionally uses combinations of unreliable clues to make a guess about the right antecedent instance of the dependent referring expression.

The renaming directive identification aspects of the illustrative embodiments recognize that these and other present limitations in resolving dependent referring expressions cause problematic natural language processing. Consider the following example sentence in a document—"The 2009 Series C Bonds will be issued under and subject to the terms and conditions contained in a resolution adopted by the County." The dependent referring expression "the 2009 Series C Bonds" refers to a specific bond, and the dependent referring expression "the County" refers to a specific county. The subject bond and the subject county of this sentence are not discernible without additional inferences, such as by determining an equality relationship between these phrases and other information provided in another part of the document, or another document in a given set of documents.

Assume that elsewhere in the document, the following sentence appears—"The $60,000,000 General Obligation Public Improvement and School Bonds, 2009 Series B (the "2009 Series B Bonds") and the $60,000,000 General Obligation Public Improvement and School Bonds, 2009 Series C (Federally Taxable-Build America Bonds—Direct Payment) (the "2009 Series C Bonds") (collectively, the "Bonds") of Shelby County, Tennessee (the "County") . . . " Resolving the dependent referring expressions of the previous sentence properly within the context of the document requires calculating the relationship of the dependent referring expressions to the full expression in the latter sentence.

The illustrative embodiments recognize that presently available NLP technologies fail in analyzing dependent referring expressions within the proper context of the document for a combination of reasons. For example, some NLP technologies fail due to the word distance or document distance between a dependent referring expression instance and a corresponding full expression. Even NLP technologies equipped with anaphoric disambiguation tools are often limited by word or document distances.

Some other NLP technologies fail to even recognize certain text as a dependent referring expression instances. For example, where some NLP technologies rely on some linguistic characteristic of the dependent referring expression, such as a singular form, a plural form of the dependent referring expression will not be recognized for resolution. As another example, an anaphoric disambiguation would miss cataphoric dependent referring expression, which are less common than anaphoric references. Other NLP technologies may suffer from a combination of these and other the shortcomings, resulting in resolving some instances of dependent referring expressions but not others.

The renaming directive identification aspects of the illustrative embodiments used to describe the invention generally address and solve the above-described problems and other problems related to the limitations of presently available NLP technology. The illustrative embodiments provide a method, system, and computer program product for disambiguation of dependent referring expression in natural language processing. The renaming directive identification aspects of the illustrative embodiments discover the instances of a dependent referring expression in a document through a filtration process. The illustrative embodiments locate the corresponding full expression across unlimited word distance or document distance in a given set of documents. Moreover, the illustrative embodiments may further use the identification of renaming directives, including the full expression, the dependent referring expression, and the referent, to generate one or more data structures that may be used to analyze textual content to extract features, determine context, determine domains, or otherwise identify portions of the textual content and deduce information about the content of the textual content. In other words, the illustrative embodiments may further provide mechanisms for bootstrapping the linguistic resources used in natural language processing (NLP), question and answer (QA) system processing, and the like, directly from the input documents using the identified renaming directives in these documents.

That is, the documents of the corpus of information being utilized by the NLP mechanisms may be analyzed to identify dependent referring expressions, or renaming directives, and utilize the identified renaming directives to generate one or more data structures relating full expressions and their associated monikers, and potentially their related referent entities, so as to provide mappings between these entities that may be used during subsequent NLP operations, such as performing analysis for purposes of question answering or the like. Such data structures may comprise ontologies for defining inventories of semantic concepts, hierarchies that define hyponym/hypernym relations between those concepts, named entity lists populated by proper names, and relation inventories that define actions or facts in the domain and the entities that can participate in those relations.

The illustrative embodiments are described with respect to certain types of documents, full expressions, and dependent referring expressions only as examples. Such types of documents, full expressions, and dependent referring expressions, or their example attributes are not intended to be limiting of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting of the illustrative embodiments. Additional data, operations, actions, tasks, activities, and manipulations will be conceivable from this disclosure and the same are contemplated within the scope of the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
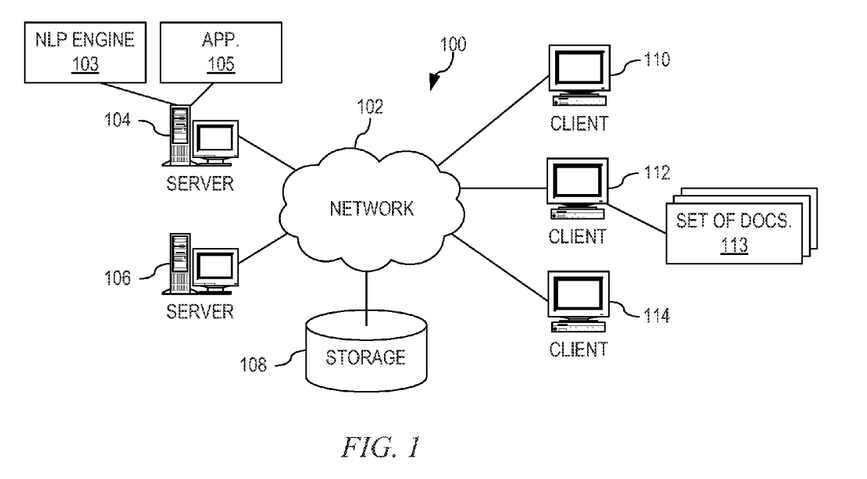
FIG. 1 depicts a pictorial representation of a network of data processing systems in which illustrative embodiments may be implemented.
Figure 2:
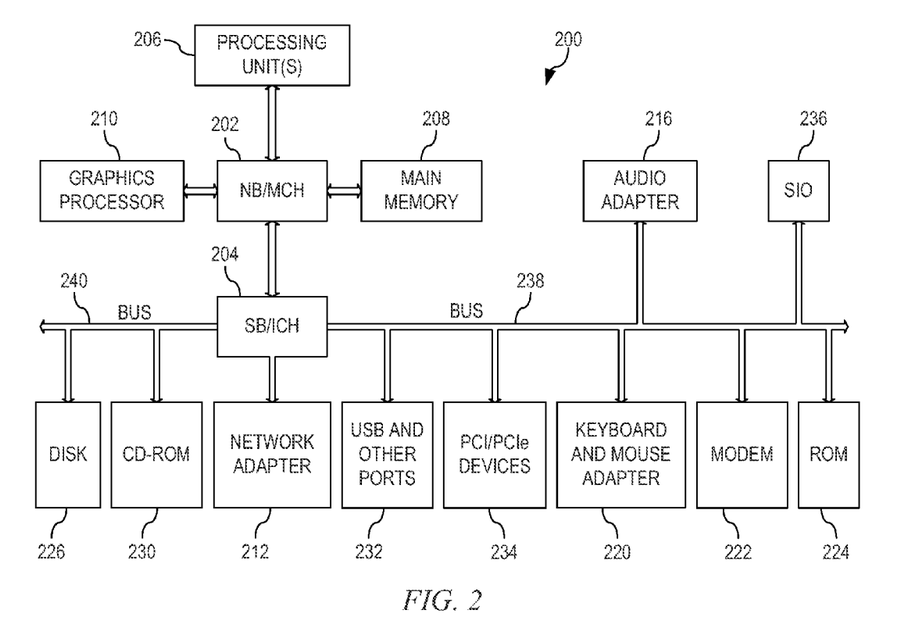
FIG. 2 is an example block diagram of a computing device in which aspects of the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with NLP engine 103. NLP engine 103 may be, for example, an existing application capable of performing natural language processing on documents, and may be modified or configured to operate in conjunction with application 105 to perform an operation according to one or more embodiments described herein. Client 112 includes a set of documents with dependent referring expression 113 that is processed according to an illustrative embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
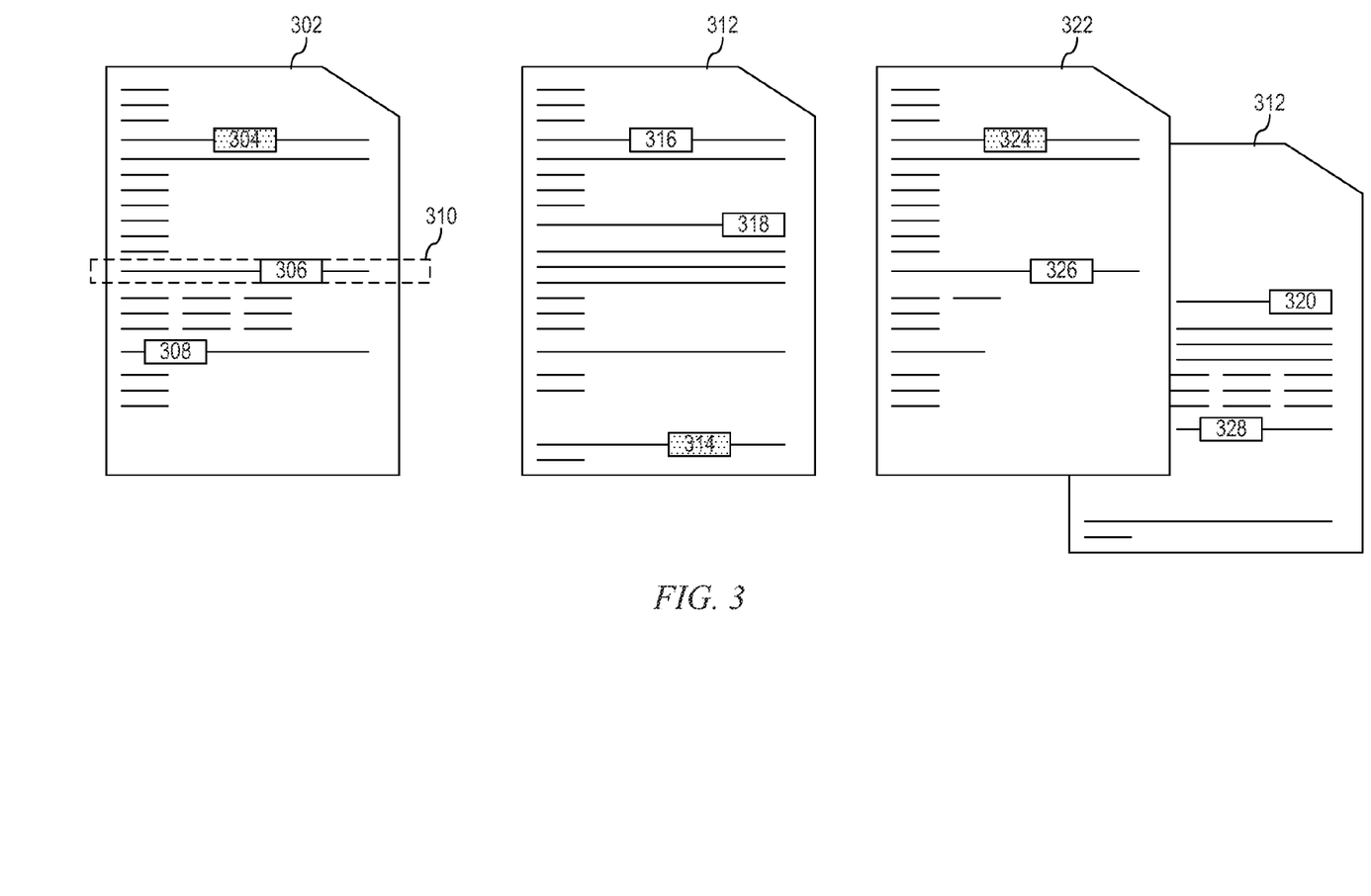
FIG. 3 is an example diagram depicting several examples of dependent referring expressions that can be resolved in accordance with an illustrative embodiment.

With reference to FIG. 3, this figure depicts several examples of dependent referring expressions that can be resolved in accordance with an illustrative embodiment. Document 302 is an example single document in which full expression 304 appears before the appearance of dependent referring expression instances 306 and 308. Document 302 is an example document that can be all or part of a set of documents 113 in FIG. 1.

Presently available NLP technologies, such as NLP engine 103 in FIG. 1, are able to resolve dependent referring expression instances only when the dependent referring expression instance appears in close proximity with the corresponding full expression. For example, a presently available NLP engine would look at the content within range 310 of dependent referring expression 306 to determine whether dependent referring expression 306 can be resolved. If full expression 304 were to appear within range 310 (not shown), a presently available NLP engine might resolve dependent referring expression 306, subject to other conditions and limitations. In the depicted example of document 302, a presently available NLP engine would not resolve dependent referring expression 306 using full expression 304.

That is, extant co-reference resolution algorithms typically search the text in reverse linear order, using syntactic clues, beginning from the dependent phrase. Because matching the dependent phrase to its sponsor is an inexact process, as the distance between the dependent phrase and its sponsor increases, the more likely it becomes that an incorrect match will be made, especially for underspecified dependent phrases such as "the County." Therefore, many algorithms limit their search to a fixed window of text. While the range of this fixed window may be increased, errors are introduced as the range is increased and thus, a distance restriction is common as an implementation detail. The illustrative embodiments of the present invention utilize dedicated dependent/sponsor matching capabilities via the renaming directives which applies a direct replacement using the renaming directive rather than a linear search. Thus, no such fixed window/distance limit is required and the corresponding issues with regard to such fixed window/distance limits are avoided.

Document 312 is another example single document in which full expression 314 appears after the appearance of dependent referring expression instances 316 and 318. A presently available NLP engine might not resolve dependent referring expression 306, owing to a combination of limitations described earlier.

Documents 322 and 323 are example documents in a set of documents, such as set of documents with dependent referring expression 113 in FIG. 1. Document 322 includes full expression 324 and dependent referring expression 326. Document 323 includes dependent referring expressions 328 and 330, which can be resolved using full expression 324 in document 322. A presently available NLP engine might not resolve dependent referring expression 306, owing to a combination of limitations described earlier. Various embodiments described herein are usable for resolving dependent referring expressions 306 and 308 to full expression 304, dependent referring expressions 316 and 318 to full expression 314, and dependent referring expressions 326, 328, and 330 to full expression 324.

Figure 4:
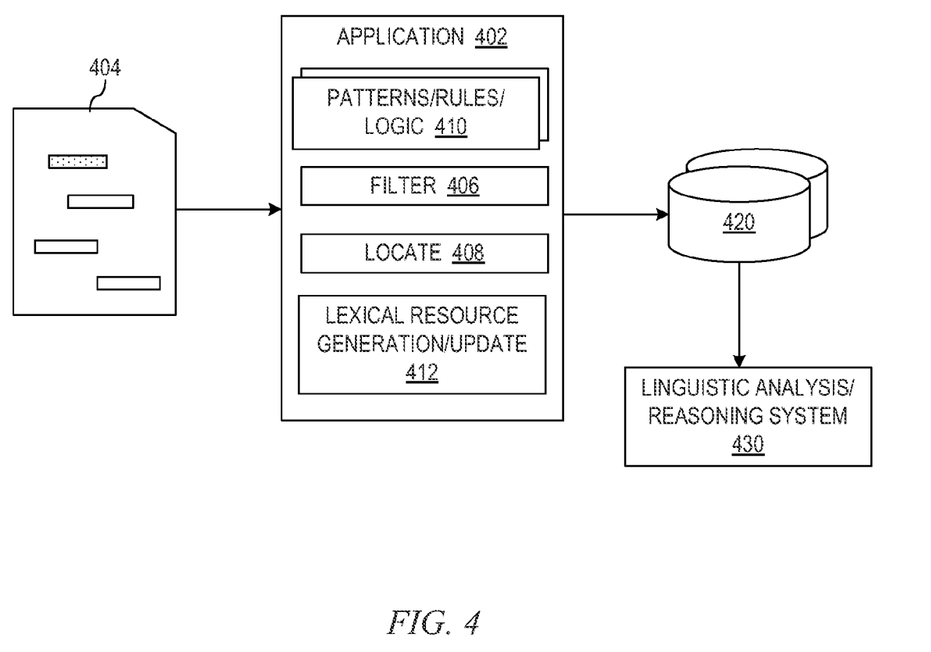
FIG. 4 is an example block diagram of an example configuration for identifying of renaming directives within documents and subsequent generation of lexical resources based on the identified renaming directives for use in natural language processing in accordance with an illustrative embodiment.

With reference to FIG. 4, this figure depicts a block diagram of an example configuration for identifying of renaming directives within documents and subsequent generation of lexical resources based on the identified renaming directives for use in natural language processing in accordance with an illustrative embodiment. It should be appreciated that the Application 402 is an example embodiment of application 105 in FIG. 1. Any of document 302, document 304, or documents 322 and 323 in FIG. 3 can be used as the set of documents 404, which includes a set of one or more full expressions and a set of one or more dependent referring expressions corresponding to each full expression in the set, with both the full expressions and their corresponding dependent referring expressions referring to a referent entity.

Application 402 receives a set of documents 404 as input for natural language processing. Component 406 selects a portion of documents 404. Component 406 filters the portion to recognize an instance of renaming directive using filter patterns, rules, or logic 410. The filter patterns, rules, and logic 410 differ from the logic used in existing NLP systems in many different ways including being able to be defined based patterns identified in documents during previous applications of the component 406 to documents and learning patterns, implementing knowledge of the particular domain of the documents being filtered and usage of language within that domain with regard to renaming directives, implementing knowledge of the general tendencies of authors and their use of renaming directives, and the like, as will be described in greater detail hereafter.

Thus, component 406 of application 402 may make use of predetermined filter criteria specified in these filter patterns, rules, or logic 410, that are defined for identifying renaming directives, and specifically the various portions of renaming directives including the full expression and its designated moniker. These predetermined filter criteria may be determined based on recognized properties of renaming directives including the full expression (long name) in renaming directives tend to be very explicit and complete full name strings rather than ambiguous references.

In addition, the recognition that, once a renaming directive has been asserted in a document, authors are motivated to take care that the moniker not be used to specify any entity other than its assigned referent, may be used to conclude that sentences containing the moniker in the document provide reliable information about the referent indicated by the full expression and can be mined to harvest relations and facts about that referent. Moreover, in certain domains, such as legal texts for example, renaming directives are utilized to identify key parties to a relationship, such as a legal agreement. This allows the document preparer to use standard document templates and fill in the names of parties to the relationship into the renaming directives at the beginning of the document. Because these are the key parties to the relationship, sentences containing the moniker term will contain relations that should be modeled for the domain.

These general properties of renaming directives, and other recognized properties of renaming directives, may be used to generate one or more orthographic and syntactic filter patterns, rules, or other logic 410 that may be used by locate component 408 and filter component 406 as filter criteria for identifying the portions of a renaming directive in documents. For example, patterns of the following type may be used in one illustrative embodiment:

Titlecase text+open parenthesis+"the"+open quotes+
        title case string+close quotes+close parenthesis     Titlecase text+comma+"henceforth referred to as"+
        title case string In some illustrative embodiments, such patterns, rules, or other logic 410 may require that the head word of a proposed dependent referring expression or moniker lexically match the full expression, e.g., "Shelby County" and "the County" where "County" lexically matches in both the full expression "Shelby County" and the dependent referring expression or moniker "the County". In other illustrative embodiments, the patterns, rules, or other logic 410 may allow the dependent referring expression or moniker to stand in some other semantic relation to the full expression, such as being a hypernym or the like.

In one embodiment, filter component 406 uses a rule or pattern 410 that recognizes an instance of the use of a defined moniker expression functioning as a dependent referring expression by recognizing certain linguistic characteristics of the words, phrases, or text segments. For example, in one embodiment, component 406 filters the selected portion of a document for capitalized words and recognizes a capitalized word as an instance of a moniker from a renaming directive that holds scope over this segment of the document. In another embodiment, component 406 filters for certain strings of characters and recognizes them as instances of a moniker from a renaming directive being used as a dependent referring expression. In another embodiment, component 406 further filters the selected portion of document(s) 404 for other forms of the recognized dependent referring expression, such as a singular or plural form, different gender form, different tense form, possessive, adjective, adverbial, or other grammatical form of the recognized dependent referring expression. As an example, if component 406 recognizes "County" as an instance of dependent referring expression due to capitalization, component 406 also recognizes "County's" as another instance of the same dependent referring expression.

Having identified both renaming directives and dependent referring expressions through the application of patterns, rules, and/or other logic by the filter component 406, locate component 408 locates, in the entire scope of the set of documents 404, a renaming directive instance for which the moniker portion matches the identified dependent referring expression. For example, having recognized the capitalized word "County" as an instance of a dependent referring expression, component 408 locates a renaming directive wherein the capitalized word "County" is stated to stand-in for the full expression specified in the renaming directive. Again, this may be done using pre-defined patterns, rules, or logic 410 that is applied by either the filter component 406 or the locate component 408, or a combination of these elements. The result is the creation of a co-referential link between the dependent referring expression that was located and determined to be an exact match to the moniker string, and the full expression.

Candidate renaming directives are scored by the location component 408 to determine a confidence measure indicating a confidence in whether a particular candidate renaming directive is in actuality a true renaming directive. The confidence measures or scores may be compared against one or more thresholds to identify candidate renaming directives that are to be considered when generating/updating lexical resources 420. The scoring may be done using one or more of a plurality of techniques including natural language processing scoring processes, machine learning scoring processes, a linear combination of scores, a decision tree, a grammar, and/or other statistical techniques or artificial intelligence techniques. Those candidate renaming directives having a sufficiently high enough confidence measure are retained for use in generating/updating lexical resources 420 via the lexical resource generation/update component 412. Those candidate renaming directives not having a sufficiently high enough confidence measure, e.g., equaling or exceeding a minimum threshold confidence measure, may be discarded from further consideration.

As an example, consider the following portion of text that may be part of a document 404 that is input to application 402:

The $60,000,000 General Obligation Public Improvement and School Bonds, 2009 Series B (the "2009 Series B Bonds") and the $60,0000,000 General Obligation Public Improvement and School Bonds, 2009 Series C (Federally Taxable—Build America Bonds—Direct Payment) (the "2009 Series C Bonds")(collectively, the "Bonds") of Shelby County, Tennessee (the "County") .
    . . .

In this example text, the candidate renaming directives that may be found by applying the patterns mentioned above include the following (presented as full expression/moniker):
(1) General Obligation Public Improvement and School Bonds, 2009 Series B/2009 Series B Bonds;
(2) General Obligation Public Improvement and School Bonds, 2009 Series C/2009 Series C Bonds;
(3) General Obligation Public Improvement and School Bonds, 2009 Series B/Bonds;
(4) General Obligation Public Improvement and School Bonds, 2009 Series C/Bonds; and
(5) Shelby County, Tennessee/County.

The decision process for determining whether a candidate renaming directive is an actual renaming directive may be implemented as a rule, or may be implemented using a machine learning method that distinguishes necessary from optional feature values. Some example features are:

The candidate Full Name should:
1) appear grammatically as a noun phrase;
2) use title case The candidate moniker should:
1) be surrounded by setoff punctuation such as comma or parentheses (open and closing delimiters match);
2) contain optional indicating phrase such as "henceforth referred to as," "the so-called", or just "the";
3) contain a lexical noun enclosed in quotes, for example "County" or "Seller";
4) be a match between the lexical noun to one or more words from the candidate Full Name.

The scoring may be based on how many of the various features a candidate renaming directive matches and the degree to which the candidate renaming directive matches. The various features may further be weighted to provide various levels of importance for the various features and these weightings may be applied to the scoring function to generate a final score for the candidate renaming directive which may be compared against a threshold to determine if the candidate renaming directive is considered to be an actual renaming directive or not (e.g., the score is equal to or higher than the threshold value. Alternatively, a simple Boolean based scoring function may be used to determine if all of the features of a renaming directive are met by the candidate renaming directive or not.

In the above example, the identified candidate renaming directives have the required properties and thus, are determined to be actual renaming directives. In other cases, necessary features may be missing and candidate renaming directives may be determined to not be actual renaming directives.

For example, consider a case in which the patterns or rules for identifying renaming directives include the pattern that the candidate full name appears grammatically as a noun phrase and uses a title case. Also consider that the pattern defines the candidate moniker, or dependent referring expression, to be surrounded by a set of punctuation such as commas (opening and closing delimiters match), the candidate moniker contains an optional indicating phrase such as "henceforth referred to as", "the so-called", or just "the", the candidate moniker contains a lexical noun enclosed in quotes, such as "County" or "Seller", and the lexical noun matches one or more words from the candidate full name.

With this set of patterns or rules in place, assume that the text being analyzed comprises the statement "if and when the County no longer remains an obligated person with respect to the Bonds (within the meaning of the Rule) . . . " In this case, the candidate full name may be "Bonds" with the candidate moniker being "Rule" since the term "Rule" is surrounded by a set of punctuation and is a lexical noun, however it is missing quotes and the term "Rule" does not match "Bonds" and the extraneous words within the parenthesis are not indicator words matching the pattern or rule. Thus, while the term "Rule" may be a candidate moniker, the fact that the term "Rule" only partially matches the pattern/rule for identifying an actual moniker causes the score for the candidate moniker to be relatively low.

As another example, consider the statement being analyzed to be "its Direct Participants: (i) by lot in the case of the 2009 Series B Bonds; and (ii) . . . " In this example, the candidate full name would be Direct Participants and a first candidate moniker would be "i". However, "i" is not a lexical noun, there are no quotation marks around it, there are no indicator words, and the delimiter ":" is not paired with a same closing delimiter. Thus, the candidate moniker "i" would have a relatively low score and would be determined not to be an actual moniker for the full name. The same is true for the moniker "ii" in that it is also not a lexical noun, there are no quotation marks, there are no indicator words, and the delimiter ";" is not paired with a matching closing delimiter.

With reference again to FIG. 4, the locate component 408 may forward to the lexical resource generation/update component 412 to analyze the maintained renaming directives to determine which lexical resources 420 need to be generated/updated and how to perform such generation/updating. The lexical resource generation/update component 412 may analyze the renaming directives and the context in which the renaming directives are present within the document 404 in accordance with configured logic, rules, patterns, and the like, to determine which lexical resources can be generated/updated based on the results of the analysis. For example, from the renaming directives, the lexical resource generation/update component 412 may identify full expression/dependent referring expressions indicating relationships between particular category entities, named entities, concepts, key party entities, abbreviations, or any other entity that may be used in lexical resources for assisting NLP, QA systems, and the like, in analyzing textual content.

As an example, take the portion of text previously mentioned above with regard to series B and series C bonds. From this example, even if no further prior knowledge is provided of the particular domain of the document being processed, one can learn the following facts through processing of the renaming directives using the logic of the lexical resource generation/update component 412. First, the dependent referring expression "County" is a category of an entity and that "Shelby County" is an instance (or sub-category) of the category "County". Similarly, "Bonds" is a category of an entity, with "Series B Bonds" and "Series C Bonds" being an instance of "Bonds." Moreover, "General Obligation Public Improvement and School Bonds, 2009 Series B" is an instance of "Series B Bonds" and "General Obligation Public Improvement and School Bonds, 2009 Series C" is an instance of "Series C Bonds." Thus, a hierarchy of categories comprising hypernym/hyponyms where instances may be leaf nodes of the hierarchy, or an ontology of categories, may be generated from the identification of renaming directives.

In addition, it can be determined that "Shelby County, Tennessee" is a specific county and thus, should be included in a list of named entities that are known to the system, e.g., NLP or QA system. However, this can also be used as a starting point to find other strings that appear in similar contexts as "Shelby County, Tennessee" to thereby discover additional names of counties. That is, by analyzing the context in which the references to "Shelby County, Tennessee" appears, the lexical resource generation/update component 412 may analyze other contexts of the same or different documents 404 for similar contexts and thereby identify portions of text where other county references may be present. Note that this discovery process is enabled through the application of the moniker, because many sentences that actually refer to Shelby County, Tennessee will do so using the moniker expression which contains only the words 'the County'. If the system had relied on finding sentences that contain the string "Shelby County, Tennessee" to discover facts about Shelby County, many facts would not be found.

From the identification of the renaming directives above, it can further be deduced by the lexical resource generation/ update component 412 that any portions of text in the document, or related documents, that contain the string "the County" are referring to Shelby County, Tennessee. In addition, it can be determined that Shelby County, Tennessee, as a named entity, is a key party to the relationship described in the document.

The identification of renaming directives further allows for neatly packaged pairs of instance/category which can be used to assist in populating lists of named entity types and generating labeled named entity instances in input documents. For example, "County" is a category and "Shelby County" is an instance of "County" such that the instance/category pair Shelby County/County may be identified. The lexical resource generation/update component 412 may identify such instance/category pairs and use these to update lists of named entity types.

The identification of renaming directives further may utilize the identified renaming directives to find key predicates/relation word for a domain. That is, monikers are generally defined within a document for key entities in the document. Entities may be key because they are important parties in a relationship described by the document, e.g., parties to a contract or other agreement, may be key because they are the focus of the document, or the like. Such monikers are often repeated many times throughout the document. Throughout a document, relations in which the moniker term is an argument can be considered to be central to the document and may be identified or flagged for further processing by the system, e.g., NLP or QA system.

The results of the analysis performed by the lexical resource generation/update component 412 may be used to generate and/or update lexical resources 420 which may then be input to a linguistic analysis/reasoning system 430, which may be a NLP system, QA system, or any other system that utilizes lexical information to assist in performing one or more operations. The lexical resources 420 may comprise one or a variety of different data structures storing lexical information for the document(s) 404 to thereby generate a model of the document(s) 404. The types of lexical resources 420 that may be generated/updated include, but are not limited to, ontologies for defining inventories of semantic concepts, hierarchies that define hyponym/hypernym relations between those concepts, named entity lists populated by proper names, and relation inventories that define actions or facts in the domain and the entities that can participate in those relations.

For example, in one illustrative embodiment, the lexical resource generation/update component 412 may, based on the identification of candidate renaming directives, and the evaluation of the confidence measures of these candidate renaming directives to identify renaming directives for consideration in generating/updating lexical resources, induce the creation of a named entity list for the document(s) 404. That is, across a document collection, a list of entities that have a same category may be consolidated, the category being specified by the moniker. The lists of entities for each of the categories may be exported as named entity lists that may be curated by a human user before being added to the set of lexical resources 420, for example.

In another illustrative embodiment, the lexical resource generation/update component 412 may induce the generation or update of concept hierarchies (ontologies). For example, multi-word dependent referring expressions or monikers typically define specialized categories. For example, if "bankruptcy court" is used as a moniker, then "bankruptcy court" can be identify as a sub-category, or instance, under the hyponym "court." The set of concepts harvested from the monikers may be used to augment or update an existing hierarchy if one exists, or may be used to bootstrap an ontology from scratch by generating a new hierarchy based on the identified renaming directives.

In a still further illustrative embodiment, key relations between entities may be identified and flagged for further processing or used to generate a lexical resource. For example, given a moniker, all sentences in a document or set of documents that include that moniker may be identified and isolated. These sentences may then be targeted/prioritized when being evaluated by language processing components, such as of a NLP system, QA system, or the like. Corresponding metadata or other information identifying these sentences as having a higher prioritization may be added to the document(s) to assist in directing focus of such language processing components. Furthermore, relations for which the moniker is an argument may be extracted from the document context. These relations may likewise be targeted/prioritized for further processing by language processing components of a linguistic analysis/reasoning system 430.

The lexical resource generation/update component 412 may implement one or more of these processes for generating/updating lexical resources 420. Moreover, the lexical resource generation/update component 412 may provide user interfaces, notifications, and the like, to interact with a user to provide suggestions as to the types of lexical resources that may be generated, types of lexical resources that may be updated, the particular updates that are recommended to be performed, the results of any such updates/generation of any new lexical resources, and the like. For example, in one illustrative embodiment, if during a process for augmenting or updating a concept hierarchy, the lexical resource generation/update component 412 determines that certain benefits may be obtained by adding metadata or otherwise marking prioritization of sentences in document(s) 404 based on key relations, then the lexical resource generation/update component 412 may generate a notification to a user suggesting that such operations be performed and solicit user input indicating whether the user wishes such operations to be performed or not. If a user selects to perform such operations, then the lexical resource generation/update component 412 may automatically do so in response to the user's input.

Thus, with the mechanisms of the illustrative embodiments, a bootstrapping of linguistic resources directly from input documents using renaming directives is achieved. The mechanisms of the illustrative embodiments may automatically generate lexical resources that can later be used by language processing components, such as may be part of a NLP system, QA system, or the like. Moreover, mechanisms of the illustrative embodiments may highlight terms/concepts that are more important or central to the content of documents in a set of documents for special consideration during processing by subsequent language processing elements. Hence, the mechanisms of the illustrative embodiments provide a significant aide to the generation/update of data assets used to perform linguistic analysis and reasoning.

It should be appreciated that the mechanisms described above may be applied to a plurality of documents 404 and across a plurality of documents 404 of one or more domains. Furthermore, the patterns, rules, and/or logic 410 used to assist in the filtering for locating renaming directives, as well as the patterns, rules, and/or logic used by the lexical resource generation/update component 412 when performing analysis on the identified renaming directives and their related contexts, may be generic and/or domain specific. That is, there may be separate patterns, rules, and/or logic established for different domains and these separate patterns, rules, and/or logic may be utilized in response to an identification of the particular domain of the document(s) 404 being processed. The domain may be specified in metadata associated with the document 404, input by a user, automatically identified by an upstream system, such as a NLP or QA system that has already analyzed the document(s) 404 to a certain degree to identify the domain of the documents, or the like. The domain may be communicated to the application 402 which may then use the identification of the domain to configure the filter component 406, locate component 408, and lexical resource generation/update component 412 to use appropriate patterns, rules, and/or logic 410 for the identified domain.

The mechanisms described above may be implemented in fully automated manner or in a semi-automated manner. In a fully automated manner, the application 402 may operate on document(s) 404 automatically and generate/update lexical resources 420 automatically with no intervention by a user. In a semi-automated manner, notifications of results may be sent to a user to have them interact with the application 402 and associated system(s) to thereby assist the user in generating/updating the lexical resources 420 with the user's input. For example, a user may be presented with the information generated by the identification of renaming directives and the analysis performed by the lexical resource generation/update component 412 to thereby direct the user's attention to potential areas where lexical resources 420 may be generated/updated. The user may then provide input specifying which lexical resources 420 to generate/update, and other input to control/orchestrate the generation and/or updating of these lexical resources 420. Other levels of interaction between human users and automated mechanisms may also be used without departing from the spirit and scope of the illustrative embodiments.

Figure 5:
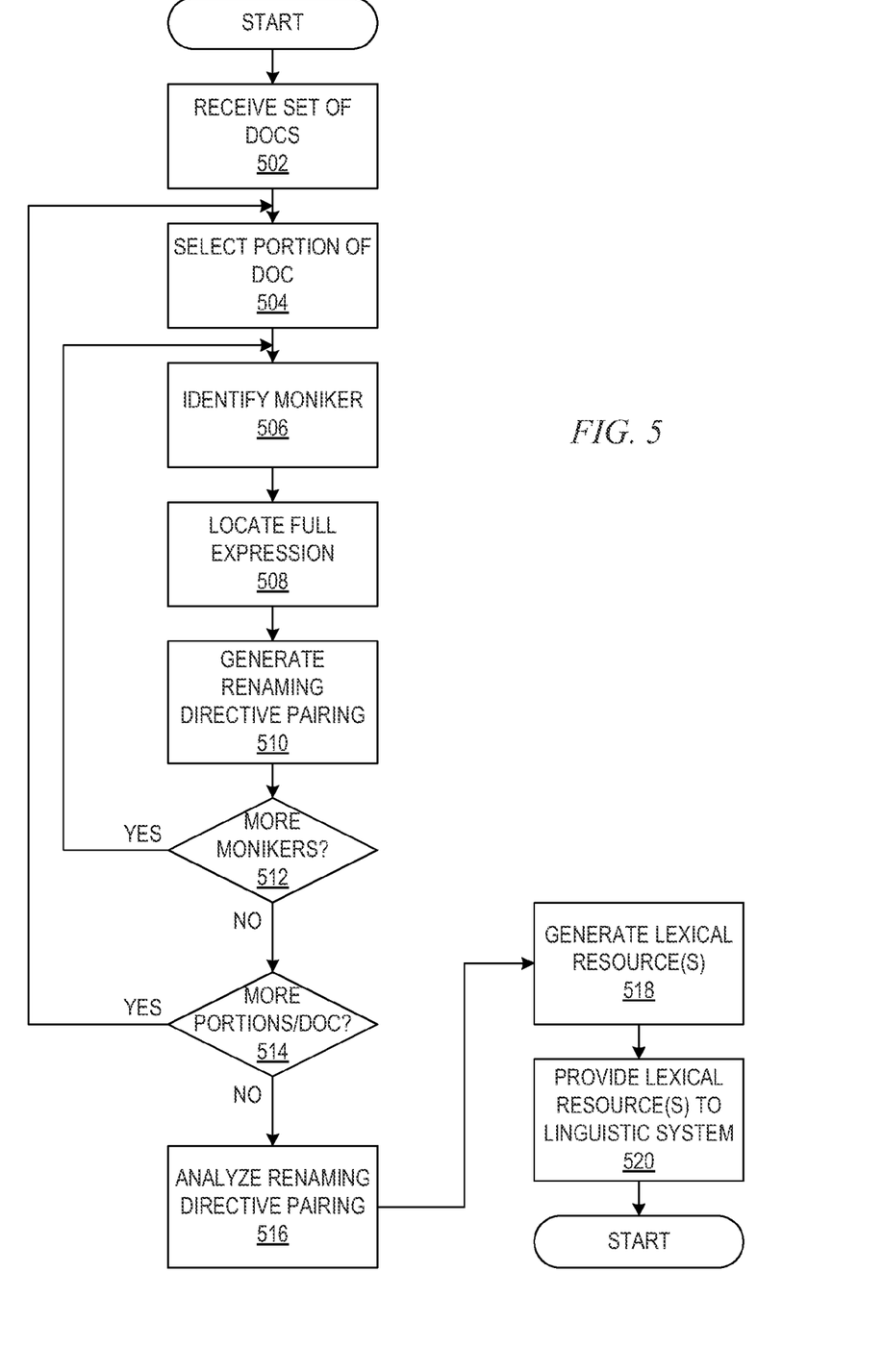
FIG. 5 is a flowchart outlining an example process of renaming directive identification and lexical resource generation/update in accordance with one illustrative embodiment.

With reference to FIG. 5, this figure depicts a flowchart of an example process of renaming directive identification and lexical resource generation/update in accordance with one illustrative embodiment. The operation outlined in FIG. 5 may be implemented, for example, by application 402 in FIG. 4 to identify renaming directives in input document(s) 404 so as to generate/update one or more lexical resources 420 for later use by a linguistic analysis/reasoning system 430, such as a NLP system, QA system, or the like.

As shown in FIG. 5, the operation starts by receiving a set of documents including one or more dependent referring expressions and corresponding full expression(s) (step 502). Process 500 selects a portion of a document in the received set (step 504). Process 500 filters the portion to identify a dependent referring expression instance that is lexically identical to a moniker identified in step 406 (step 506). Process 500 locates a full expression within the set of documents that is part of an identified renaming directive for which the identified dependent referring expression instance (moniker phrase) references the full expression (step 508). Process 500 generates a pairing of full expression and dependent referring expression based on the identification of the dependent referring expression and its corresponding full expression (step 510).

Process 500 determines whether more instances of dependent referring expression are present in the selected portion (step 512). If more instances of the same or different dependent referring expression are present ("Yes" path of step 512), process 500 returns to step 506 and identifies another instance. If no more instances of dependent referring expressions are present in the section ("No" path of step 512), process 500 determines whether more portions or documents remain to be processed in a similar manner (step 514).

If more portions or documents remain ("Yes" path of step 514), process 500 returns to step 504 and selects another portion in the same or different document in the received set. If no more portion or documents remain to be analyzed ("No" path of step 514), process 500 analyzes the pairings (renaming directives) and their context to determine one or more lexical resources to be generated/updated based on the identification of this pairing (step 516). Process 500 generates the lexical resources (step 518) and provides them to a linguistic analysis/reasoning system for use in processing documents (step 520). Process 500 ends thereafter.

It should be appreciated that the figures herein are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described herein with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for generating a lexical resource for linguistic analysis, the method comprising:
   receiving, by the data processing system, a document data structure comprising a renaming directive in natural language textual content of the document data structure, wherein the renaming directive is a statement that specifies a correspondence between a full expression and a moniker that is stand-in text for the full expression;
   applying, by the data processing system, filter logic to the document data structure to identify the renaming directive within the natural language textual content of the document data structure;
   analyzing, by the data processing system, the renaming directive to identify a relationship between semantic concepts represented by the renaming directive that are to be used to update a lexical resource based on the renaming directive;
   updating, by the data processing system, the lexical resource based on results of analyzing the renaming directive; and
   outputting, by the data processing system, the updated lexical resource to a linguistic analysis system, wherein the linguistic analysis system performs linguistic analysis of a portion of textual content based on the updated lexical resource.

2. The method of claim 1, wherein updating the lexical resource comprises generating a new lexical resource based on the results of analyzing the renaming directive.

3. The method of claim 1, wherein the lexical resource is one of an ontology of semantic concepts, a hierarchy of hyponym/hypernum relations between semantic concepts, a named entity list, or a relation inventory defining relations of actions or facts in a domain and entities that can participate in those relations.

4. The method of claim 1, wherein the renaming directive comprises a full expression paired with one or more dependent referring expressions, wherein the pairing of the full expression with the one or more dependent referring expressions represent the relationship of semantic concepts.

5. The method of claim 1, wherein the filter logic comprises patterns or rules for identifying a full expression and a moniker that refers to the full expression.

6. The method of claim 5, wherein analyzing the renaming directive comprises identifying key predicates/relation words for a domain based on the moniker and full expression of the renaming directive.

7. The method of claim 5, wherein analyzing the renaming directive comprises identifying an instance/category pair, where the moniker represents an instance of a category represented by the full expression.

8. The method of claim 5, wherein updating the lexical resource based on results of analyzing the renaming directive comprises updating a named entity list associated with the document data structure with an instance/category pair where the moniker represents an instance of a category represented by the full expression.

9. The method of claim 5, wherein updating the lexical resource based on results of analyzing the renaming directive comprises creating a new ontology, or updating an existing ontology, to include a category for the full expression and a sub-category for the moniker in the new ontology or existing ontology.

10. The method of claim 5, wherein updating the lexical resource based on results of analyzing the renaming directive comprises:
    identifying in the document data structure, instances of the renaming directive within the document data structure to thereby identify one or more portions of the document data structure for prioritized processing; and
    processing the one or more portions of the document data structure with a higher priority than other portions of the document data structure, based on the identification of the one or more portions of the document data structure.

11. A computer program product comprising a computer readable storage medium having a computer readable program stored therein, wherein the computer readable program, when executed on a computing device, causes the computing device to:
    receive a document data structure comprising a renaming directive in natural language textual content of the document data structure, wherein the renaming directive is a statement that specifies a correspondence between a full expression and a moniker that is stand-in text for the full expression;
    apply filter logic to the document data structure to identify the renaming directive within the natural language textual content of the document data structure;
    analyze the renaming directive to identify a relationship between semantic concepts represented by the renaming directive that are to be used to update a lexical resource based on the renaming directive;
    update the lexical resource based on results of analyzing the renaming directive; and
    output the updated lexical resource to a linguistic analysis system, wherein the linguistic analysis system performs linguistic analysis of a portion of textual content based on the updated lexical resource.

12. The computer program product of claim 11, wherein the computer readable program further causes the computing device to update the lexical resource at least by generating a new lexical resource based on the results of analyzing the renaming directive.

13. The computer program product of claim 11, wherein the lexical resource is one of an ontology of semantic concepts, a hierarchy of hyponym/hypernum relations between semantic concepts, a named entity list, or a relation inventory defining relations of actions or facts in a domain and entities that can participate in those relations.

14. The computer program product of claim 11, wherein the renaming directive comprises a full expression paired with one or more dependent referring expressions, wherein the pairing of the full expression with the one or more dependent referring expressions represent the relationship of semantic concepts.

15. The computer program product of claim 11, wherein the filter logic comprises patterns or rules for identifying a full expression and a moniker that refers to the full expression.

16. The computer program product of claim 15, wherein the computer readable program further causes the computing device to analyze the renaming directive at least by identifying key predicates/relation words for a domain based on the moniker and full expression of the renaming directive.

17. The computer program product of claim 15, wherein the computer readable program further causes the computing device to analyze the renaming directive at least by identifying an instance/category pair, where the moniker represents an instance of a category represented by the full expression.

18. The computer program product of claim 15, wherein the computer readable program further causes the computing device to update the lexical resource based on results of analyzing the renaming directive at least by updating a named entity list associated with the document data structure with an instance/category pair where the moniker represents an instance of a category represented by the full expression.

19. The computer program product of claim 15, wherein the computer readable program further causes the computing device to update the lexical resource based on results of analyzing the renaming directive at least by creating a new ontology, or updating an existing ontology, to include a category for the full expression and a sub-category for the moniker in the new ontology or existing ontology.

20. The computer program product of claim 15, wherein the computer readable program further causes the computing device to update the lexical resource based on results of analyzing the renaming directive at least by:

identifying in the document data structure, instances of the renaming directive within the document data structure to thereby identify one or more portions of the document data structure for prioritized processing; and processing the one or more portions of the document data structure with a higher priority than other portions of the document data structure, based on the identification of the one or more portions of the document data structure.

21. An apparatus comprising:

a processor; and a memory coupled to the processor, wherein the memory comprises instructions which, when executed by the processor, cause the processor to:

receive a document data structure comprising a renaming directive in natural language textual content of the document data structure, wherein the renaming directive is a statement that specifies a correspondence between a full expression and a moniker that is stand-in text for the full expression;

apply filter logic to the document data structure to identify the renaming directive within the natural language textual content of the document data structure;

analyze the renaming directive to identify a relationship between semantic concepts represented by the renaming directive that are to be used to update a lexical resource based on the renaming directive;

update the lexical resource based on results of analyzing the renaming directive; and output the updated lexical resource to a linguistic analysis system, wherein the linguistic analysis system performs linguistic analysis of a portion of textual content based on the updated lexical resource.

* * * * *